B. S. CARTWRIGHT.
ELECTRICALLY DRIVEN TIRE INFLATING PUMP.
APPLICATION FILED APR. 11, 1916.

1,234,130.

Patented July 24, 1917.
2 SHEETS—SHEET 1.

Inventor
B. S. Cartwright

By Geo. P. Kimmel
Attorney

B. S. CARTWRIGHT.
ELECTRICALLY DRIVEN TIRE INFLATING PUMP.
APPLICATION FILED APR. 11, 1916.
1,234,130.
Patented July 24, 1917.
2 SHEETS—SHEET 2.
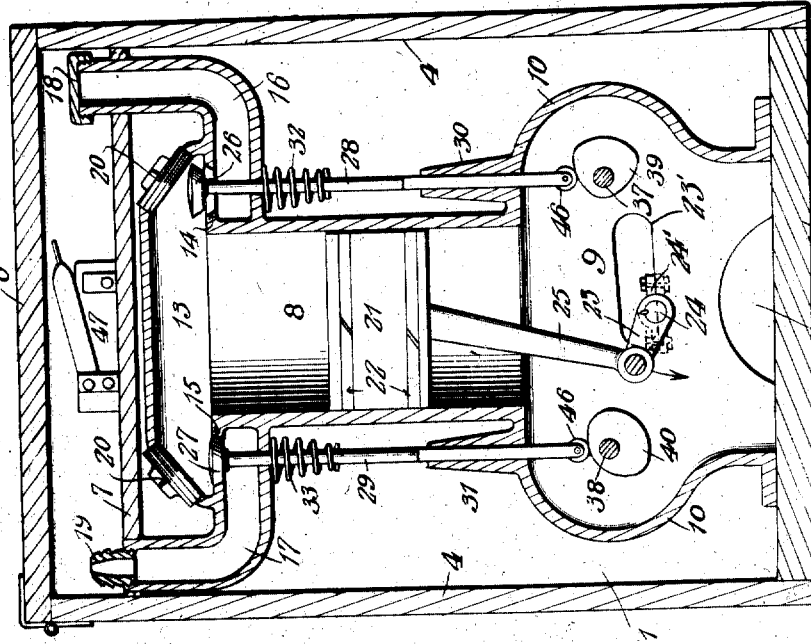
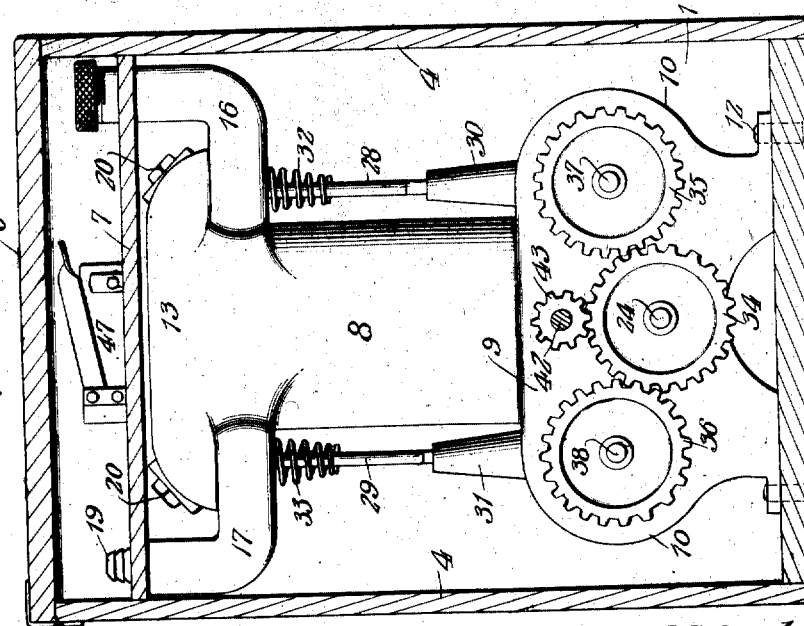
Inventor
B.S. Cartwright
By Geo. P. Kimmel
Attorney

UNITED STATES PATENT OFFICE.

BENJAMIN S. CARTWRIGHT, OF OELRICHS, SOUTH DAKOTA.

ELECTRICALLY-DRIVEN TIRE-INFLATING PUMP.

1,234,130.  Specification of Letters Patent.  Patented July 24, 1917.

Application filed April 11, 1916. Serial No. 90,405.

*To all whom it may concern:*

Be it known that I, BENJAMIN S. CARTWRIGHT, a citizen of the United States, residing at Oelrichs, in the county of Fall River and State of South Dakota, have invented certain new and useful Improvements in Electrically-Driven Tire-Inflating Pumps, of which the following is a specification.

The present invention relates to pumps and more particularly to new and useful improvements in electrically driven air pumps.

An object of my invention is to provide in a simple and cheap structure an improved automobile tire pump having an electric motor associated therewith for driving the pump, the pump and motor being compactly arranged in a housing, whereby the device may be easily transported from place to place as desired. The motor employed in conjunction with my improved pump is preferably low powered, that is the motor which will supply sufficient power for the pump from a source of low voltage, such as a storage battery or the ignition system of an automobile.

Other objects and advantages to be derived from the use of my improved pump will appear from the following detail description and the claims, taken with an inspection of the accompanying drawings, in which—

Figure 1:
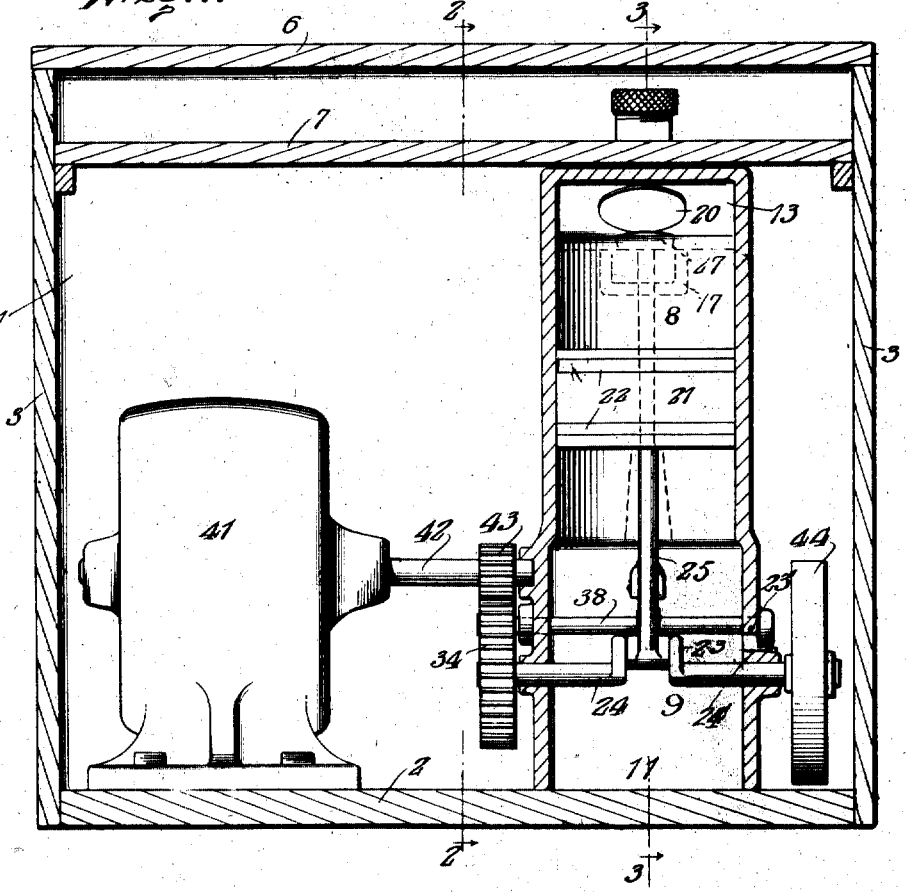
Figure 4:
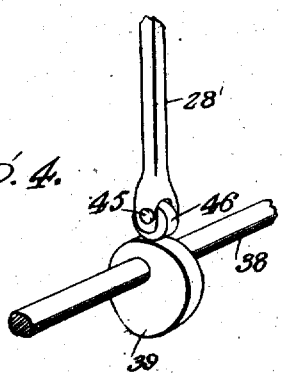

Figure 1 is a vertical longitudinal sectional view of my improved pump, the pump structure being shown in vertical section, Fig. 2 is a vertical transverse sectional view taken on the line 2—2 of Fig. 1, looking in the direction of the arrow, Fig. 3 is a similar view taken on the line 3—3 of Fig. 1, looking in the direction of the arrow, and Fig. 4 is a fragmental perspective view of the cam operating mechanism for the inlet and outlet valve mechanism.

Referring more particularly to the drawings, in which similar characters of reference designate like and corresponding parts throughout the various views, 1 designates in its entirety a housing having a bottom wall 2, end walls 3, side 4, and a hinged top wall 6. The top wall 6 may be locked in any suitable manner and provided with any suitable handle. A partition 7 is mounted horizontally in the housing 1 slightly below the upper marginal of the walls thereof for a purpose which will hereinafter appear.

My invention contemplates the provision of a simple, strong and durable, yet lightly constructed pump for inflating automobile tires. With this end in view I have provided a pump embodying a cylinder 8 having a crank case 9 provided with enlarged portions 10 to accommodate cams hereinafter described. A relatively large opening 11 is provided in the bottom of the crank case 9 to facilitate inspection of the operating mechanism, the crank case being bolted as at 12 or otherwise secured to the bottom wall 2 of the housing 1. I provide an enlarged portion 13 at the upper end of the cylinder 8 forming an air chamber, said enlarged portion 13 having communicating therewith entrance and exit ports 14 and 15, respectively. The inlet and outlet ports form valve seats and communicate with the inlet and outlet conduits 16 and 17, respectively, said conduits 16 and 17 being upwardly turned, the conduit 16 being provided with a closing cap 18 when not in use, and the outlet or exit conduit 17 being provided with a removable serrated nipple 19 for connection with a hose or the like flexible conducting means the end of which is to be attached to the tire or the like. The enlarged portion 13 is provided with a pair of removable screw plugs 20 for permitting inspection of the valve members hereinafter described or to permit insertion or removal of said valve members.

The pumping element of my invention comprises a piston 21 reciprocally mounted in the cylinder 8 and having the usual packing ring 22, said cylinder being connected with the crank 23 of a crank shaft 24 by means of a connecting rod 25, I provide valve members for controlling the entrance and exit ports 14 and 15, said valve members being designated 26 and 27, respectively, and being of the disk type. In order to facilitate removal of the crank shaft when desired one of the walls of the crank casing 9 is provided with a slot 23′ and a demountable bearing 24′ serves to mount the crank shaft adjacent thereto. To remove the shaft the crank is turned to register with the slot, the gear 34 and bearing 24′ are removed and the shaft may be withdrawn.

The valve members mentioned are carried on the upper ends of operating rods 28 and 29 formed in two sections, respectively, said rods having the lower portions squared and being reciprocally mounted in bearings 30 and 31 formed integrally with the crank casing 9 and extending upwardly therefrom. The rods 28 and 29 extend through the entrance and exit conduits as best shown in Fig. 3. A pair of coil springs designated 32 and 33, respectively, serve to maintain the valves 26 and 27 normally in closed position. I provide means for opening and closing the valve in proper sequence, said means including a main power receiving gear 34 keyed to the crank shaft 24 and meshing valve operating gears 35 and 36 mounted on cam shafts 37 and 38 which in turn carry cams 39 and 40, respectively. The lower ends of the valve rods 28 and 29 engage the cams 39 and 40, and suitable anti-friction rollers, best shown in Fig. 3, being carried by the lower ends of said valve rods for eliminating friction between the ends of the rods and the cams.

An electric motor 41 is mounted in the housing 1 of the bottom wall 2 thereof, said motor having the usual armature shaft 42 carrying a pinion 43 for making engagement with the main power receiving gear 34 hereinbefore referred to. A fly wheel 44 is mounted on the rear end of the shaft 24 for assisting in maintaining a steady non-fluctuating pumping operation.

The preferred arrangement of the anti-friction rollers hereinbefore referred to is shown in Fig. 4 wherein the lower end of one of the valve rods in this instance the rod 28 is bifurcated to provide spaced arms 45 between which is journaled an anti-friction roller 46.

A suitable circuit controlling means may be provided for the motor 41, said means preferably comprising a knife switch 47 arranged on the partition 7 to be easily accessible for use. It will be seen that in using my improved pump an automobile tire may be quickly and easily inflated, the device being relatively small and intended for easy reception into the tool box of an automobile. The cams 39 and 40 are adapted to alternately and intermittently open and close the valve members 26 and 27, respectively, upon each downward and upward stroke of the piston 21. It will be readily apparent that those skilled in the art that the construction of my improved pump, while embodying all the necessary qualifications for strength and durability, is light in construction, easily manufactured and effective in operation.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

1. In a portable pump of the class described, a combination of a housing, a horizontally extending partition adjacent the top of said housing, a pump cylinder secured to the bottom of said housing, air inlet and outlet passages for said cylinder in the housing, a piston operable in said cylinder, valve controlling means for the air passages, a motor secured to the bottom of said housing and operatively associated with the piston and valve controlling means, and a control switch for said motor on the partition adjacent the top of said housing.

2. In a portable pump of the class described, a combination of a housing having a hinged top, a horizontally extending partition beneath said top, a pump cylinder and crank casing secured to the bottom of said housing, air inlet and outlet passages for said cylinder extending upwardly through the partition, a piston operable in said cylinder, a removable crank shaft in said casing engaging the piston and having one end extending through said casing, parallel supplemental shafts in said casing operably engaging the valve control means and having one end extending through said casing, said projecting ends having intermeshing gears thereon, a motor secured to the bottom of the housing and having one end of its axis mounted in the outer wall of the crank case, a pinion thereon intermeshing with the gear on the crank shaft, and a control switch for the motor on the partition in the top of the housing.

In testimony whereof I affix my signature hereto.

BENJAMIN S. CARTWRIGHT.